Patented Aug. 8, 1944

2,355,269

UNITED STATES PATENT OFFICE 2,355,269

BLASTING EXPLOSIVE

Robert W. Cairns, Wilmington, Del., assignor to Hercules Powder Company, Wilmington, Del., a corporation of Delaware No Drawing. Application December 13, 1939, Serial No. 309,039

4 Claims. (Cl. 52—14)

This invention relates to blasting explosives, and more particularly to non-gelatinous blasting explosives resistant to water and moisture.

Non-gelatinous blasting explosives, commonly called dynamites, usually consist of a liquid explosive, e. g. nitroglycerine, or mixtures thereof with nitroglycol in admixture with ammonium nitrate, sodium nitrate and a carbonaceous material, for example, wood pulp.

A disadvantage of such dynamites is the great hygroscopicity and solubility in water of the inorganic nitrate content thereof. During storage or shipment, such dynamites tend to absorb moisture, and lose sensitiveness to detonation, because of the increased moisture content. When used in wet boreholes, such dynamites rapidly absorb water and become inert to detonation.

In the past, attempts have been made to overcome this disadvantage by dipping the dynamite cartridge in paraffin wax, or the like to seal the cartridge against water and moisture, but with only partial success. Attempts have also been made to coat the crystals of inorganic nitrate with waterproofing or moisture-repelling agents, such as paraffin wax, nitrocellulose, petrolatum, ozokerite, nitrated resin, sodium-, calcium- or zinc soaps, sulfurized oils, nitronaphthalenes or nitrotoluenes, sodium silicate, and the like, or with a mixture comprising approximately 15 parts by weight of rosin, 80 parts by weight of paraffin wax and 5 parts by weight of petrolatum, but, again, with only partial success.

Coating crystals of inorganic nitrate with nitrocellulose, nitronaphthalenes, or nitrotoluenes is ineffective for the reason that the nitroglycerin or nitroglycol content of the dynamite dissolves such coatings. Coating inorganic nitrate with the other materials heretofore used has resulted in only partial protection against water and moisture.

The object of this invention is to produce a blasting explosive which is resistant to water and moisture.

A further object of this invention is to produce a coated inorganic salt which is resistant to water and moisture.

A still further object of this invention is to provide a means of coating an inorganic salt in a manner that causes it to be highly water resistant.

A still further object of this invention is to provide a means of coating a salt with a solid resin.

Other objects will be apparent hereinafter.

I have found that I may prepare coated ammonium nitrate or sodium nitrate or potassium nitrate, which, when used in dynamite, renders said dynamites as water-resistant as semi-gelatin dynamites. This I accomplish by coating the inorganic nitrate with about 0.1% to about 5%, preferably with about 0.5% to about 2% of a solid resin which has a drop melting point of less than about 125° C.

Now in accordance with this invention I coat inorganic salts with resins which are solid at room temperatures and which have a drop melting point of less than about 125° C. Examples of the type resins which are suitable for use in my invention are wood rosin, gum rosin, substantially petroleum hydrocarbon insoluble pine wood resin, ester gum, dammar, coumarone-indene, mastic, and their equivalents. Each of these resins has a melting point of less than about 125° C. when determined by the drop melting point method described below.

The melting point is determined by the Hercules drop method which is carried out as follows: A small amount of the composition is melted in a beaker and a thermometer graduated from 0° C.–250° C. in 1° divisions, about 13–14 inches long, having about a ⅝ inch long bulb ¼ inch in diameter, inserted through a cork, is dipped into the molten composition and a film of uniform thickness weighing from 0.5 to 0.55 g. is collected and cooled. The thermometer is then placed in a test tube about ⅞ inch in diameter and from 7–8 inches long so that the bulb is about 1 inch from the bottom of the tube, being held in position by the cork which fits the test tube. The test tube is then placed into an 800 cc. beaker filled with 3½ inches of transparent oil so that the bottom of the test tube is approximately one inch from the bottom of the tube. The test is begun with a bath temperature of 90° C. The melting point, perhaps more accurately expressed as the softening point is that temperature as indicated by the thermometer with the sample, at which an elongated drop forms and constricts on the end of the thermometer bulb. If the sample has not melted at 80° C. the temperature of the bath is raised slowly, keeping the latter always 10° C. above the temperature of the sample.

The method which I have used to coat the inorganic salts with the resins includes grinding the resin to a powder which will pass about a 100 mesh screen and mixing, for example, at room temperature, this pulverized material thoroughly into the salt to be coated. The admixture is then heated with constant stirring to a temperature approaching the drop melting point of the resin, but preferably to between about 5° and about 20° C. below the drop melting point of the resin being used as a coating agent. This temperature is sufficient to soften the resin so that a thorough distribution and coating is obtained on each grain of the salt.

A specific example of the preparation of a coated inorganic salt of this invention is given below.

A quantity of wood rosin was powdered and screened through a 100 mesh sieve. About 1 part by weight of this powdered rosin was then added to 100 parts by weight of ammonium nitrate and the two ingredients thoroughly mixed together at room temperature. After this preliminary mixing the mass was heated while stirring was continued until the temperature was raised to about 75° C. This temperature was maintained for 30 minutes and the mass stirred constantly to insure perfect coating of each grain. The mass was then cooled and was ready for use in explosive formulation. This specific example of coated material was tested in the following manner:

The test I employ to determine the resistance to water of coated inorganic nitrate, and of the dynamite made therewith, comprises packing the material firmly into a 25 cc. Gooch crucible, covering the material with a layer of cheese cloth stretched tightly over the top, immersing the crucible and contents in water at 65° F. in an inverted position to a depth of 2 inches, suspended by wires. After a predetermined time, the crucible and contents are removed and drained, the dry contents separated by a knife from the moistened portion, and the weight of the former determined as percentage of the original content.

The comparative water resistance of the coated and uncoated ammonium nitrate prepared and tested as described above are given in Table 1.

*Table 1*

| Material | Water resistance |
|---|---|
| | Per cent |
| Uncoated ammonium nitrate | 0 |
| Coated ammonium nitrate | 69 |

The comparative water resistance of explosive compositions prepared from coated and uncoated ammonium nitrate is given in Table 2. The composition of the explosives tested in Table 2 are nitroglycerin, 12.5%; dinitrotoluene, 1.0%; sodium nitrate, 5.0%; wood pulp, 7.0%; chalk, 0.7%; and ammonium nitrate, 73.8%.

*Table 2*

| Material | Water resistance |
|---|---|
| | Per cent |
| Explosive composition containing 73.8% uncoated ammonium nitrate | 0 |
| Explosive composition containing 73.8% coated ammonium nitrate | 30 |

Other resins which I have found may be employed as coating agents in accordance with my invention, their drop melting points, the coating temperature used, and the water resistance of ammonium nitrate coated therewith are given in Table 3. The coating procedure described hereinbefore was used in the tests given in Table 3. For purposes of comparison, the results of Example 1 above are included in Table 3.

*Table 3*

| Coating agent | Drop melting point | Coating temperature | Water resistance |
|---|---|---|---|
| | °C. | °C. | Per cent |
| I wood rosin | 82 | 75 | 69 |
| Ester gum | 102 | 95 | 78 |
| Dammar | 114 | 105 | 69 |
| Coumarone-indene | 96 | 78 | 73 |
| Substantially petroleum-hydrocarbon insoluble pine wood resin | 117 | 110 | 74 |

The possibility of being able to produce explosives which have a high water resistance is extremely advantageous since many blasting operations are carried out under wet conditions. The process in accordance with this invention allows water resistant explosives to be prepared efficiently and economically which is also advantageous.

The material which is characterized by the term "substantially petroleum-hydrocarbon insoluble pine wood resin," herein and in the appended claims, is the resinous material which may be prepared from pine wood, preferably from stump pine wood, in the following manner. The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present compositions. Extraction of this mixture with a petroleum-hydrocarbon such as, for example, gasoline, dissolves and removes the rosin. After separation of the rosin, high in abietic acid, a resinous residue remains which is low in abietic acid. Alternatively, the initial coal tar hydrocarbon extract may be treated with furfural, and the two layers which form, separated, in which case the resinous residue is found dissolved in the furfural from which it may be obtained by evaporation of the furfural. This resinous residue, used in the composition of the present invention, is characterized by a dark red brown color, cherry red in solution, and by substantial insolubility in petroleum-hydrocarbons, but it will vary somewhat in its specific characteristics such as acid number, melting point, exact petroleum ether solubility, and content of naphtha and toluol insoluble material, depending upon the details of the extraction processes utilized. This resin will meet or nearly meet the following specifications, namely substantial insolubility in petroleum-hydrocarbons, substantially complete solubility in alcohol, a methoxy content from about 3% to about 7.5% (usually from about 4% to about 6%) an acid number in the range from about 90 to about 110, and a drop melting point in the range from about 95° C. to about 125° C.

It will be understood that the details and examples given hereinbefore are illustrative only and in no way limiting on my invention as broadly described hereinbefore and in the appended claims.

This is a continuation-in-part of my application, Serial Number 152,668, filed July 8, 1937, Patent Number 2,211,738.

What I claim and desire to protect by Letters Patent is:

1. Inorganic nitrate in granular form containing from about 0.1% to about 5.0% by weight of substantially petroleum - hydrocarbon insoluble pine wood resin uniformly distributed throughout the nitrate and coating the individual particles thereof.

2. Ammonium nitrate in granular form containing from about 0.1% to about 5.0% by weight of substantially petroleum-hydrocarbon insoluble pine wood resin uniformly distributed throughout the nitrate and coating the individual particles thereof.

3. An explosive including inorganic nitrate in granular form containing from about 0.1% to about 5.0% by weight of substantially petroleum-hydrocarbon insoluble pine wood resin uniformly distributed throughout the nitrate and coating the individual particles thereof.

4. An explosive including ammonium nitrate in granular form containing from about 0.1% to about 5.0% by weight of substantially petroleum-hydrocarbon insoluble pine wood resin uniformly distributed throughout the nitrate and coating the individual particles thereof.

ROBERT W. CAIRNS.